(12) United States Patent
Miyashita

(10) Patent No.: US 9,298,998 B2
(45) Date of Patent: Mar. 29, 2016

(54) IMAGE PROCESSING APPARATUS, IMAGE PROCESSING METHOD, AND COMPUTER-READABLE MEDIUM

(71) Applicant: FUJI XEROX CO., LTD., Minato-ku, Tokyo (JP)

(72) Inventor: Harunobu Miyashita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 198 days.

(21) Appl. No.: 14/277,875

(22) Filed: May 15, 2014

(65) Prior Publication Data

US 2015/0098649 A1  Apr. 9, 2015

(30) Foreign Application Priority Data

Oct. 9, 2013 (JP) ................................. 2013-211808

(51) Int. Cl.
*G06K 9/00* (2006.01)
*G06K 9/20* (2006.01)

(52) U.S. Cl.
CPC .................... *G06K 9/2063* (2013.01)

(58) Field of Classification Search
CPC .... G06K 9/2063; G06K 9/342; G06K 9/4652
USPC ................................................ 382/165, 164
See application file for complete search history.

(56) References Cited

U.S. PATENT DOCUMENTS

| 4,878,178 A * | 10/1989 | Takakura ................... G06T 1/60 345/589 |
| 6,701,010 B1 * | 3/2004 | Katsuyama ........... G06T 7/0081 382/165 |
| 6,774,909 B1 * | 8/2004 | Nishio .................... G09G 5/028 345/593 |
| 2005/0128297 A1 * | 6/2005 | Katsuyama ........... G06F 3/0386 348/155 |
| 2015/0049937 A1 * | 2/2015 | Choi ..................... G06T 7/0051 382/154 |
| 2015/0098647 A1 * | 4/2015 | Miyashita ............ G06K 9/4652 382/164 |

FOREIGN PATENT DOCUMENTS

| JP | 2000-222394 A | 8/2000 |
| JP | 2001-014303 A | 1/2001 |
| JP | 2002-278960 A | 9/2002 |
| JP | 2007-004621 A | 1/2007 |

* cited by examiner

*Primary Examiner* — Mekonen Bekele
(74) *Attorney, Agent, or Firm* — Sughrue Mion, PLLC

(57) ABSTRACT

The image processing apparatus includes a color extraction unit, a region cutting-out unit, a determination unit, and a sticky-note-image cutting-out unit. The color extraction unit extracts pixels by using multiple thresholds, which are prepared in advance for a color space, for a color used in sticky notes, from image information including information about the sticky notes. The region cutting-out unit cuts out a region which is a group of the pixels extracted by the color extraction unit, for each of the thresholds. The determination unit determines a threshold to be employed, from the thresholds on the basis of the number of regions which are cut out by the region cutting-out unit. The sticky-note-image cutting-out unit cuts out a sticky note image from the image information by using the threshold determined by the determination unit.

6 Claims, 5 Drawing Sheets

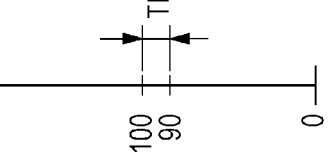
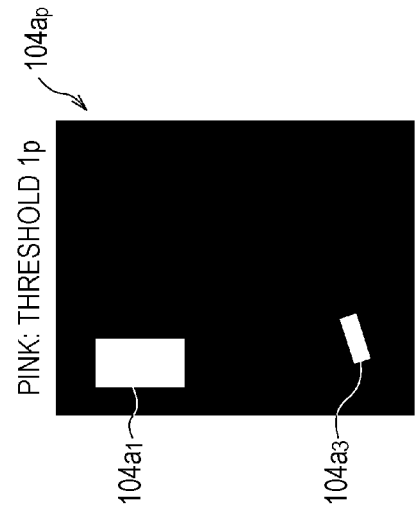
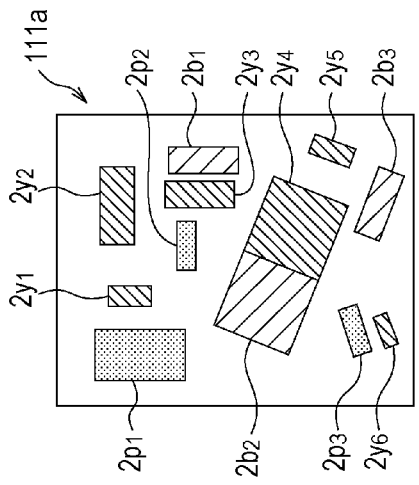
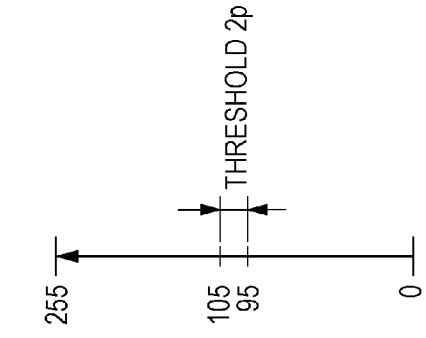
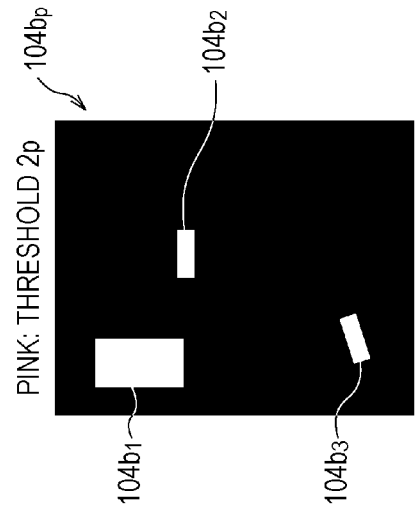

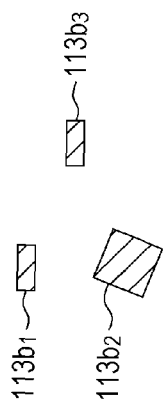
FIG. 4E
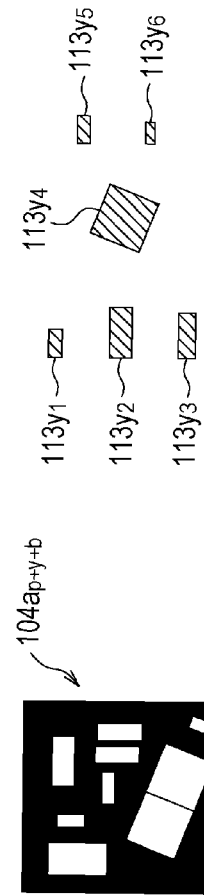
FIG. 4D
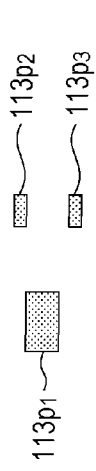
FIG. 4A
FIG. 4B
FIG. 4C

IMAGE PROCESSING APPARATUS, IMAGE PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2013-211808 filed Oct. 9, 2013.

BACKGROUND

Technical Field

The present invention relates to an image processing apparatus, an image processing method, and a computer-readable medium.

SUMMARY

According to an aspect of the present invention, an image processing apparatus described below is provided.

The image processing apparatus includes a color extraction unit, a region cutting-out unit, a determination unit, and a sticky-note-image cutting-out unit. The color extraction unit extracts pixels by using multiple thresholds for at least one color used in multiple sticky notes, from image information including information about the sticky notes. The thresholds are prepared in advance for a color space. The region cutting-out unit cuts out at least one region which is a group of the pixels which are extracted by the color extraction unit, for each of the thresholds. The determination unit determines a threshold to be employed, from the thresholds on the basis of the number of regions which are cut out by the region cutting-out unit. The sticky-note-image cutting-out unit cuts out at least one sticky note image from the image information by using the threshold determined by the determination unit.

BRIEF DESCRIPTION OF THE DRAWINGS

Exemplary embodiments of the present invention will be described in detail based on the following figures, wherein:

FIGS. 3A to 3E are schematic diagrams for describing a threshold determination operation of the image processing apparatus;

FIGS. 4A to 4E are schematic diagrams for describing a sticky-note cutting-out operation of the image processing apparatus.

DETAILED DESCRIPTION

Exemplary Embodiment

Configuration of Image Processing Apparatus

Figure 1:
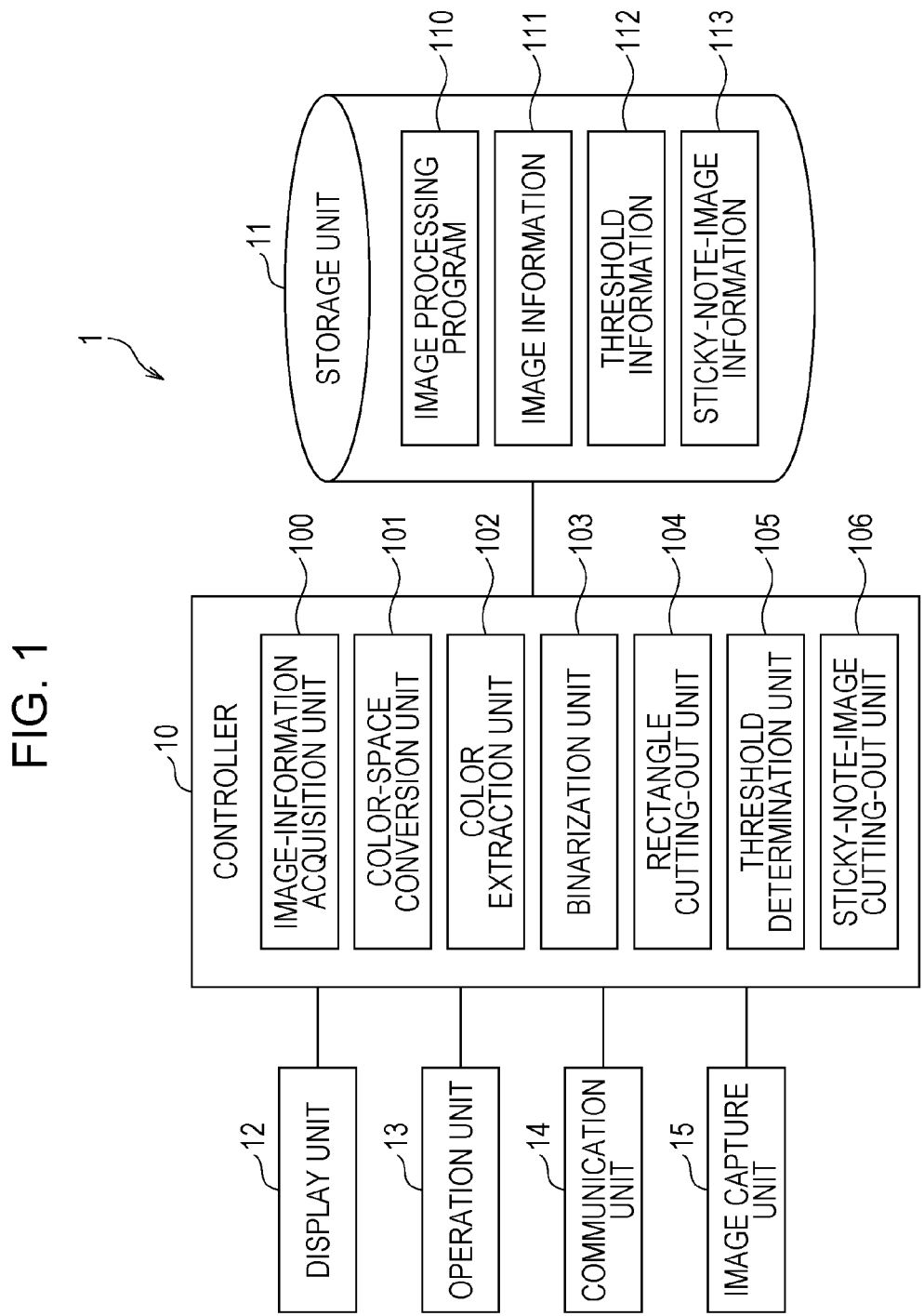
FIG. 1 is a schematic diagram illustrating an exemplary configuration of an image processing apparatus according to an exemplary embodiment.

FIG. 1 is a schematic diagram illustrating an exemplary configuration of an image processing apparatus according to an exemplary embodiment.

An image processing apparatus 1 which is, for example, a cellular phone or a tablet personal computer (PC) includes a central processing unit (CPU) and controls units. The image processing apparatus 1 also includes a controller 10 which executes various programs, a storage unit 11 which includes a storage medium such as a flash memory and which stores information, a display unit 12 which displays characters, images, and the like, an operation unit 13 for operating the image processing apparatus 1, a communication unit 14 which communicates with the outside via a network, and an image capture unit 15 which includes a lens and a charge coupled device (CCD) and which generates image information by capturing an image.

The controller 10 executes an image processing program 110 described below, thereby serving as an image-information acquisition unit 100, a color-space conversion unit 101, a color extraction unit 102, a binarization unit 103, a rectangle cutting-out unit 104, a threshold determination unit 105, a sticky-note-image cutting-out unit 106, and the like.

The image-information acquisition unit 100 obtains image information 111 obtained by photographing a pasting surface on which multiple sticky notes are attached, from the storage unit 11. The image information 111 may be obtained by capturing an image by using the image capture unit 15, or may be obtained from the outside via the communication unit 14.

The color-space conversion unit 101 converts the color space of the image information 111 which is, for example, RGB (red, green, blue) into HSV (hue, saturation, value). The color space is not limited to HSV. The color space may be converted into any color space as long as it is one in which color extraction described below is satisfactorily performed. Alternatively, no conversion may be performed and the color space may remain RGB.

The color extraction unit 102 extracts pixels which satisfy a threshold, for each of predetermined colors (pink, yellow, and cyan) from the image information 111 obtained through color conversion. Multiple thresholds are set in advance in the threshold information 112, and pixels are extracted for each of the thresholds.

For each of the predetermined colors (pink, yellow, and cyan), the binarization unit 103 sets "1" (white) to the pixels extracted by the color extraction unit 102, and sets "0" (black) to the other pixels, thereby performing binarization.

The rectangle cutting-out unit 104 is an exemplary region cutting-out unit, and cuts out regions, each of which is a group of pixels to which "1" (white) is set by the binarization unit 103, to obtain regions of rectangular shape which is an exemplary shape, for each of the predetermined colors (pink, yellow, and cyan). Each of the obtained regions is not limited to a rectangular region, and it may be a region having a regular polygon shape, a shape defined by a curve, or any closed region. Alternatively, the shape of sticky notes 2a, 2b, 2c, and the like may be registered in advance, and a region having the registered shape may be obtained through the cutting-out operation.

The threshold determination unit 105 counts the rectangular regions which are cut out by the rectangle cutting-out unit 104, for each of the predetermined colors (pink, yellow, and cyan), and sets the threshold for which the number of rectangular regions is the largest, as a threshold to be employed.

The sticky-note-image cutting-out unit 106 cuts out images of the rectangular regions which are cut out with the employed threshold, from the image information 111 as sticky-note-image information 113 for each of the predetermined colors (pink, yellow, and cyan).

The storage unit 11 stores the image processing program 110 which causes the controller 10 to function as the units 101 to 106 described above, the image information 111, the threshold information 112, the sticky-note-image information 113, and the like.

When the image information 111 is to be obtained from the outside via the communication unit 14, the image processing apparatus 1 does not necessarily include the image capture unit 15. The image processing apparatus 1 may be a server which does not include the display unit 12 and the operation unit 13, and which operates by receiving a request from an external terminal via the communication unit 14.

Operations of Image Processing Apparatus

The operations according to the exemplary embodiment will be described by classifying them into (1) basic operations, (2) a threshold determination operation, and (3) a sticky-note cutting-out operation.

(1) Basic Operations

Figure 2:
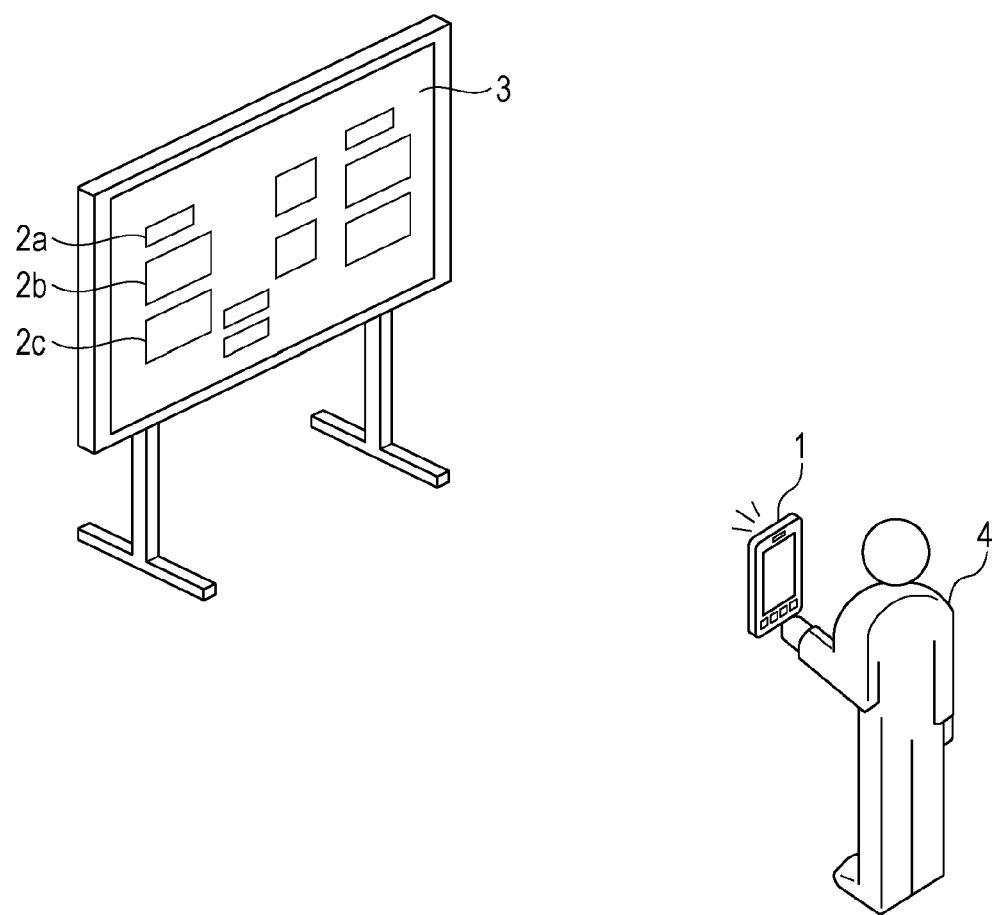
FIG. 2 is a schematic diagram for describing basic operations of the image processing apparatus.

FIG. 2 is a schematic diagram for describing the basic operations of the image processing apparatus 1.

As illustrated in FIG. 2, a user 4 first performs writing or the like on the sticky notes 2a, 2b, 2c, and the like, for example, for brainstorming, and attaches the sticky notes 2a, 2b, 2c, and the like on the writing surface of a whiteboard 3 which is used as the pasting surface. Various shapes may be employed as the shape of the sticky notes 2a, 2b, 2c, and the like. In the description, it is assumed that the sticky notes 2a, 2b, 2c, and the like have a rectangular shape. The sticky notes 2a, 2b, 2c, and the like may have different sizes.

Then, after the brainstorming, the user 4 photographs the writing surface of the whiteboard 3 on which the sticky notes 2a, 2b, 2c, and the like are attached, by using the image capture unit 15 of the image processing apparatus 1.

When the image capture unit 15 captures an image, the image processing apparatus 1 stores the captured image as the image information 111 in the storage unit 11.

For future use of information on the sticky notes 2a, 2b, 2c, and the like attached on the whiteboard 3, the user 4 requests the image processing apparatus 1 to convert the information on the sticky notes 2a, 2b, 2c, and the like to electronic formats. That is, the user 4 requests that each of the images of the sticky notes 2a, 2b, 2c, and the like captured as the image information 111 be cut out so as to be used as the sticky-note-image information 113.

The operations performed by the image processing apparatus 1 when the above-described request is submitted will be described below.

(2) Threshold Determination Operation

Figure 5:
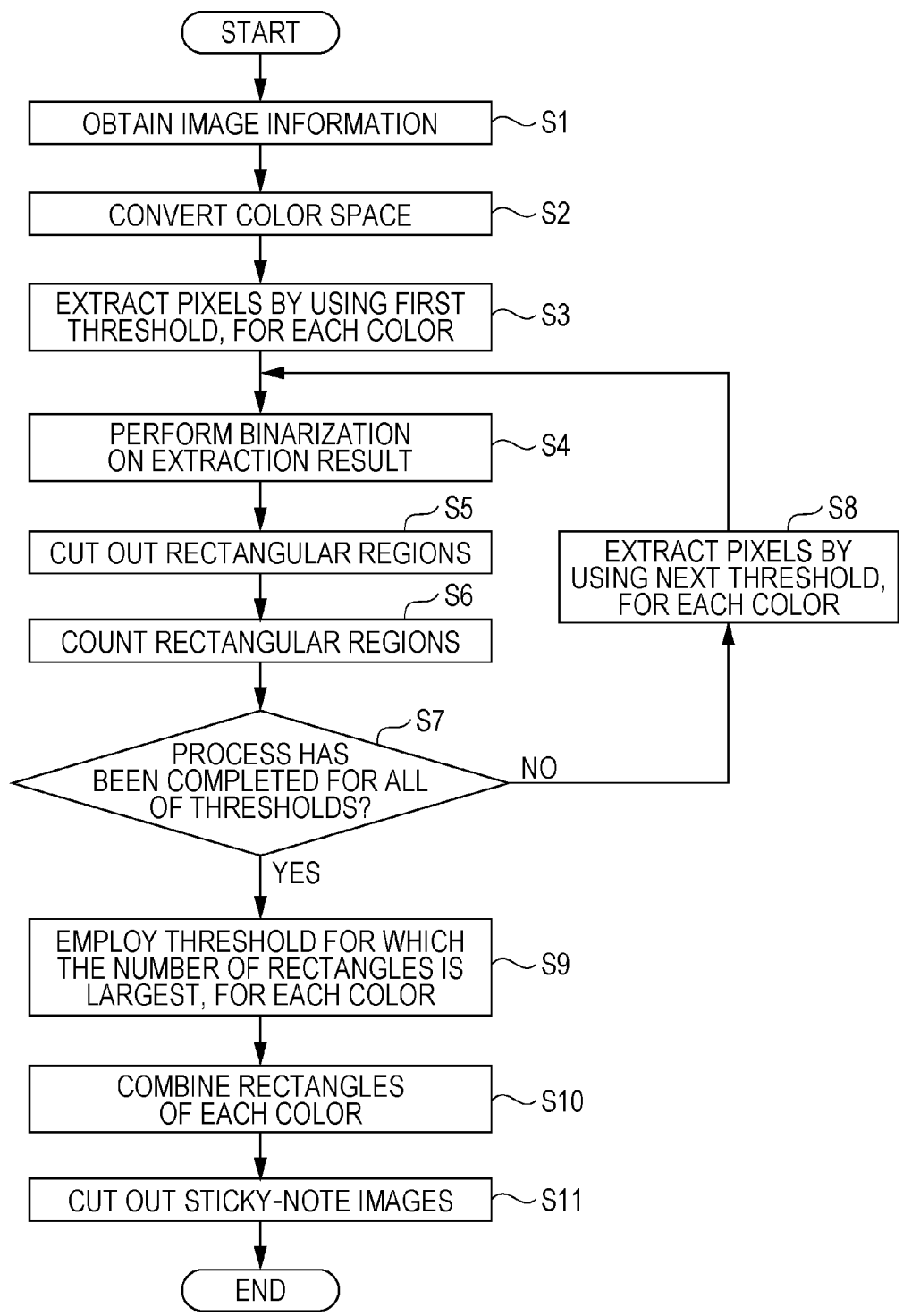
FIG. 5 is a flowchart of exemplary operations of the image processing apparatus.

FIG. 5 is a flowchart of exemplary operations of the image processing apparatus 1. FIGS. 3A to 3E are schematic diagrams for describing the threshold determination operation of the image processing apparatus 1.

As illustrated in FIG. 3A, the image-information acquisition unit 100 obtains image information 111a as exemplary image information 111 from the storage unit 11 (in step S1). The image information 111a is obtained by photographing sticky notes $2p_1$, $2p_2$, and $2p_3$ of pink, sticky notes $2y_1$, $2y_2$, $2y_3$, $2y_4$, $2y_5$, and $2y_6$ of yellow, and sticky notes $2b_1$, $2b_2$, and $2b_3$ of cyan.

Then, when the color space of the image information 111a is RGB, the color-space conversion unit 101 converts it to HSV (in step S2).

The color extraction unit 102 extracts pixels which satisfy a threshold, for each of the predetermined colors (pink, yellow, and cyan) from the image information 111 obtained through the color conversion. Among the thresholds which are set in advance in the threshold information 112, a first threshold 1p is used to extract pixels (in step S3). For the sake of simplicity, a case in which extraction for pink is performed will be described.

As illustrated in FIG. 3C, the threshold 1p ranges from 90 to 100. In the case where the color space is an HSV space and where the minimum value of the parameters of H (hue), S (saturation), and V (value) is zero and the maximum value is 255, the threshold 1p has values of H, S, and V, each of which has the range. In the example in FIG. 3C, for the sake of simplicity, only the H parameter threshold is illustrated.

As illustrated in FIG. 3B, the binarization unit 103 sets "1" (white) to the pixels extracted by the color extraction unit 102 as those satisfying the threshold 1p for pink, and sets "0" (black) to the other pixels, thereby performing binarization (in step S4).

As illustrated in FIG. 3B, the rectangle cutting-out unit 104 cuts out regions of the pixels which are set to "1" (white) by the binarization unit 103 for pink, for example, as rectangular regions $104a_1$ and $104a_3$ (rectangle $104a_p$) (in step S5).

The threshold determination unit 105 counts the rectangular regions which are cut out by the rectangle cutting-out unit 104 by using the threshold 1p for pink and obtains "2" (in step S6).

The color extraction unit 102 extracts pixels from the image information 111 by using a threshold 2p for pink (in step S8). As illustrated in FIG. 3E, the threshold 2p ranges from 95 to 105.

As illustrated in FIG. 3D, the binarization unit 103 sets "1" (white) to the pixels extracted by the color extraction unit 102 as those satisfying the threshold 2p for pink, and sets "0" (black) to the other pixels, thereby performing binarization (in step S4).

As illustrated in FIG. 3D, the rectangle cutting-out unit 104 cuts out regions of the pixels which are set to "1" (white) by the binarization unit 103 for pink, for example, as rectangular regions $104b_1$ to $104b_3$ (rectangle $104b_p$) (in step S5).

The threshold determination unit 105 counts the rectangular regions which are cut out by the rectangle cutting-out unit 104 by using the threshold 2p for pink and obtains "3" (in step S6).

Steps S3 to S8 described above are repeatedly performed for each of two or more thresholds, and the threshold determination unit 105 employs the threshold for which the number of rectangles is the largest (in step S9). It is assumed that the threshold 2p for which the number of rectangles is "3" which is the largest is employed for pink.

The determination of employment of a threshold as described above is made for each of the colors (yellow and cyan) other than pink. Under the assumption that a threshold 1y is employed for yellow and that a threshold 3b is employed for cyan, the sticky-note cutting-out operation will be described below.

(3) Sticky-Note Cutting-Out Operation

FIGS. 4A to 4E are schematic diagrams for describing the sticky-note cutting-out operation of the image processing apparatus 1.

As illustrated in FIG. 4D, the rectangle cutting-out unit 104 combines a rectangle $104b_p$, a rectangle $104a_y$, and a rectangle $104c_b$ which are cut out for the colors (pink, yellow, and cyan), respectively, and which are illustrated in FIGS. 4A to 4C to obtain a rectangle $104a_{p+y+b}$ (in step S10).

The sticky-note-image cutting-out unit 106 cuts out images of the rectangular regions in the combined rectangle $104a_{p+y+b}$ from the image information 111a as pieces of sticky-note-image information $113p_1$ to $113p_3$ for pink, pieces of sticky-note-image information $113y_1$ to $113y_6$ for yellow, and pieces of sticky-note-image information $113b_1$ to $113b_3$ for cyan (in step S11).

Other Embodiments

The present invention is not limited to the exemplary embodiment described above. Various changes may be made without departing from the gist of the present invention. For example, for each of the pieces of sticky-note-image information $113p_1$ to $113p_3$ for pink, the pieces of sticky-note-image information $113y_1$ to $113y_6$ for yellow, and the pieces of sticky-note-image information $113b_1$ to $113b_3$ for cyan, relative position information and inclination information of the corresponding sticky note with respect to the writing surface of the whiteboard 3, the shooting date and time of the original image, and the like may be recorded as associated information.

In the above-described exemplary embodiment, the functions of the units 100 to 106 of the controller 10 are achieved through programs. Some or all of the units may be achieved through hardware such as an application-specific integrated circuit (ASIC). In addition, the programs used in the exemplary embodiment may be provided by storing them in a recording medium such as a compact disc-read-only memory (CD-ROM). Replacement, deletion, addition, and the like of the steps described in the exemplary embodiment may be made as long as the gist of the present invention is not changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a color extraction unit that extracts pixels by using a plurality of thresholds for at least one color used in a plurality of sticky notes, from image information including information about the plurality of sticky notes, the plurality of thresholds being prepared in advance for a color space;
    a region cutting-out unit that cuts out at least one region which is a group of the pixels which are extracted by the color extraction unit, for each of the plurality of thresholds;
    a determination unit that determines a threshold to be employed, from the plurality of thresholds on the basis of the number of regions which are cut out by the region cutting-out unit; and
    a sticky-note-image cutting-out unit that cuts out at least one sticky note image from the image information by using the threshold determined by the determination unit.

2. The image processing apparatus according to claim 1, wherein the determination unit sets a threshold for which the number of regions which are cut out by the region cutting-out unit is the largest, as the threshold to be employed.

3. The image processing apparatus according to claim 1, wherein the region cutting-out unit cuts out the at least one region having a shape predetermined for the at least one region.

4. The image processing apparatus according to claim 2, wherein the region cutting-out unit cuts out the at least one region having a shape predetermined for the at least one region.

5. A non-transitory computer readable medium storing a program causing a computer to execute a process for image processing, the process comprising:
    extracting pixels by using a plurality of thresholds for at least one color used in a plurality of sticky notes, from image information including information about the plurality of sticky notes, the plurality of thresholds being prepared in advance for a color space;
    cutting out at least one region which is a group of the extracted pixels, for each of the plurality of thresholds;
    determining a threshold to be employed, from the plurality of thresholds on the basis of the number of regions which are cut out; and
    cutting out at least one sticky note image from the image information by using the determined threshold.

6. An image processing method comprising:
    extracting pixels by using a plurality of thresholds for at least one color used in a plurality of sticky notes, from image information including information about the plurality of sticky notes, the plurality of thresholds being prepared in advance for a color space;
    cutting out at least one region which is a group of the extracted pixels, for each of the plurality of thresholds;
    determining a threshold to be employed, from the plurality of thresholds on the basis of the number of regions which are cut out; and
    cutting out at least one sticky note image from the image information by using the determined threshold.

* * * * *